Figure 1:
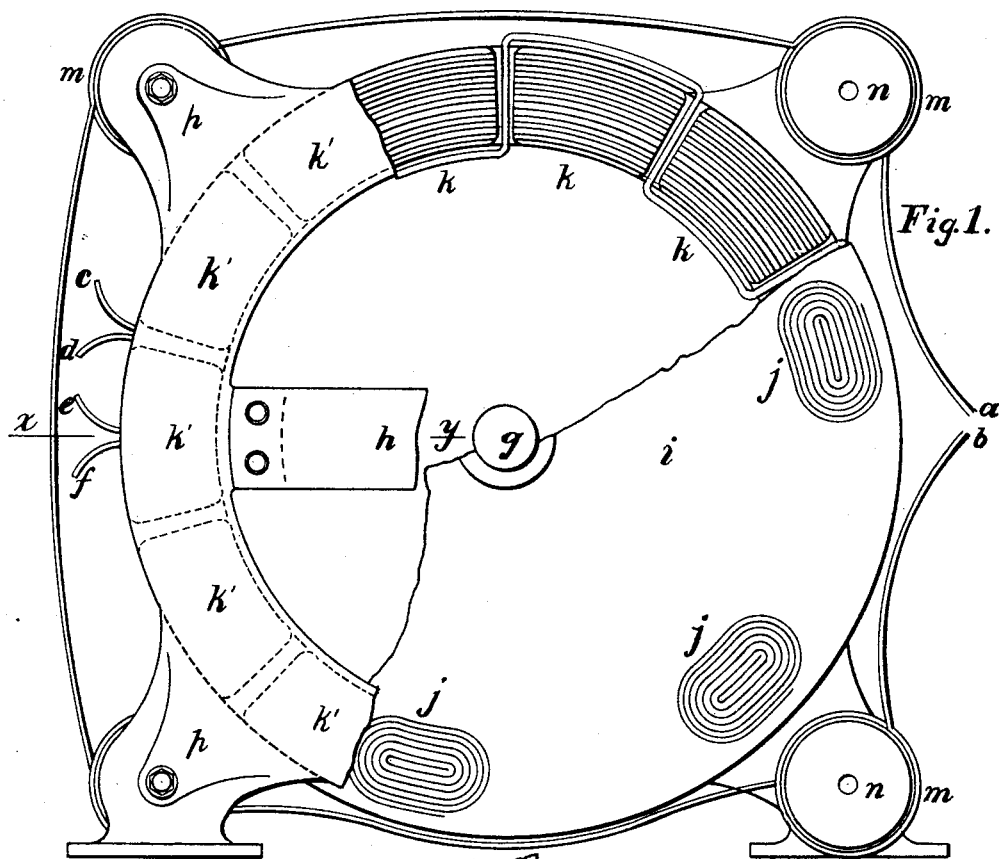

(No Model.)

H. FAIRBANKS.
ALTERNATING CURRENT GENERATOR.

No. 590,098. Patented Sept. 14, 1897.

WITNESSES:
Marion Fairbanks.
Dorothy Fairbanks.

INVENTOR
Henry Fairbanks.

UNITED STATES PATENT OFFICE.

HENRY FAIRBANKS, OF ST. JOHNSBURY, VERMONT.

ALTERNATING-CURRENT GENERATOR.

SPECIFICATION forming part of Letters Patent No. 590,098, dated September 14, 1897.

Application filed March 6, 1897. Serial No. 626,317. (No model.)

*To all whom it may concern:*

Be it known that I, HENRY FAIRBANKS, of St. Johnsbury, in the county of Caledonia and State of Vermont, have invented certain new and useful Improvements in Alternating-Current Generators, of which the following, taken in connection with the accompanying drawings, is a specification.

This invention relates to inductor-alternator dynamos in which there is no moving copper and the electrical impulse is due to the magnetic flux being directed through the cores of the generator-coils by inductor masses of soft iron moved across the ends of these cores. It has been usual in dynamos of this general type to arrange for producing rapid periodic reversals of the polarity of the cores upon which the generator-coils are wound. I have found it equally effective to provide for the rapid periodic variation of intensity of the magnetism in these cores without reversing it, which I accomplish by dividing each pole of the field-magnet at its end into two or more branches or pole divisions and winding these divisions alternately right and left with the generating-coils and arranging for the movement of inductor masses across their ends. Preferably I construct the magnetic field with its resultant poles facing each other, having their ends nearly or quite parallel and divided into suitable divisions by slots or openings, through which the generator-coils are wound, and arrange to move between them inductor masses of substantially the same size as the presenting ends of these divisions and as nearly bridging the space between the opposite poles as is consistent with freedom of motion. In its simplest form a horseshoe-magnet is made in the form of a letter C, its poles divided into two branches by a narrow slot in each, these branches or divisions wound right and left with insulated-wire, and a rotary or vibratory device arranged to carry a mass of laminated iron rapidly between first the right-hand-wound and then the left-hand-wound branches, whereby the magnetic circuit being completed, first through one and then through the other, the flux so directed induces an electrical impulse first in one direction and then in the other, giving a sharp alternating current. A rotary motion is the smoothest and most manageable, and one or more inductor masses may be carried by a brass disk in a way to shift the magnetic bridge constantly from the right-hand wound to the left and back, and such a machine with only two divisions of each pole would be practically successful; but the same frequency of alternations could be secured with a machine running much slower if each pole were divided into more branches or pole divisions and if these were arranged around in a circle and stood out like the teeth of a crown-wheel. One field-magnet may be shaped to secure this form of presenting ends of poles, or two or more magnets acting parallel to each other may be combined in one field and forming by their resultant poles two hollow cylinders or cylindrical rings standing out toward each other with their presenting ends divided to receive the right and left hand windings, and between the parallel ends of these poles a rotary carrier may be arranged upon an axis central to the said cylindrical rings to carry masses of soft iron bridging across between the north and south poles, the number and spacing being such that they shall be all fairly presented in one position to all the right-hand-wound pole divisions, and in the next position shall bridge between all the similar left-hand-wound divisions, and the magnetic flux being so directed, first through one set and then through the other, an electrical impulse will be given at each change and the machine in each revolution of the carrier will induce as many electrical reversals as there are divisions or as many cycles as there are inductor masses.

All the generating-coils upon the divisions of both poles may be connected in one circuit and the machine will deliver a single-phase alternating-current if the pole divisions of one pole are exactly opposite to those of the other; but if it is desired to generate currents in different phase the divisions of the two poles must be staggered with reference to each other so that the centers of the coils of one pole shall be opposite to the edges of the like generating-coils upon the divisions of the other pole and the two sets of generating-coils must be connected into two circuits instead of one. It is evident that when the machine is constructed in this way the divisions of one pole are reached by the moving inductor masses earlier by half their breadth than the divisions of the other, and the two electrical impulses will differ by half a wavelength. This two-phase machine is chosen for illustration, and if this is understood other groupings of magnets in the field and of inductor masses and carrier will be seen to be only varieties of arrangement. The divisions of either pole may be spaced for two circuits, giving a four-phase effect by similar means.

Figure 2:
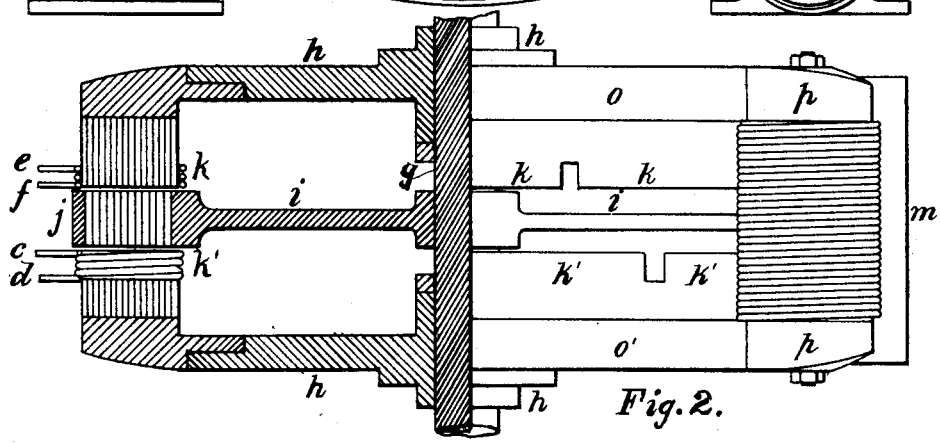

In the drawings, Figure 1 is a side view of the complete machine with parts broken away to show a portion of the carrier and inductor masses, and a portion of this carrier removed to uncover the face of the farther pole of the field, showing its pole divisions and an indication of the winding of the generating-coils wound upon them. Fig. 2 is a top view, one half in section on a level with the axis of rotation—namely, the line $x\,y$.

In this machine the field consists of two flat rings $o\,o'$, each having four extensions $p\,p$, &c., through which the said rings forming the two sides of the machine are joined to iron cylinders $n\,n$, connecting them, and being the cores upon which the exciting solenoid-coils of the field are wound in parallel, making one of the said flat rings a north pole and the other a south pole. These two ring-poles are extended toward each other by cylindrical rings made up of long ribbons of soft iron or mild steel wound upon each other into a hoop shape, and the presenting ends are cut by radial slots into the required number of pole divisions, the said slots being deep enough to receive the right and left hand wound generator-coils, as shown at $k\,k$ and by dotted lines at $k'\,k'$. The current generated upon the front side, the pole $o'$ with its pole divisions $k'\,k'$, is taken off by the wires $c\,d$, and that in the other phase, upon the divisions $k\,k$ of the pole $o$, by the wires $e\,f$, while the field is magnetized by a current from an exciter (not shown) through the wires $a\,b$.

The brass bearing-boxes $h\,h$ are supported, as shown, from the ring-poles $o\,o'$ and carry the shaft $g$, which may also require end stops. (Not shown.) Upon this shaft is mounted the disk-shaped brass carrier $i$, through which, near the circumference, extend the inductor masses $j\,j$, preferably made up of mild steel ribbon wound upon itself into a close coil nearly the size of the presenting ends of the pole divisions and spaced to fairly present at one time to the alternate divisions of either pole—namely, in one position to all the right-hand-wound divisions of that pole and in the next position to all the left-hand-wound divisions of the same. The mechanical advantages of this construction are apparent, in that the only moving part is the light disk carrying the small inductor masses adapted to bridge across the air-gap between the resultant poles of the field. The electrical advantages are also evident, in that the field is continuously magnetized and continuously armed, the armatures or inductor masses being constantly between the poles, so that there is no serious reaction against the magnetizing-current of the field, as when there are reversals of magnetism, but the continuous magnetic circuit generated by the continuous current is simply directed first through one set of pole divisions or branches and then through another, and the arrangement made for producing currents in different phase is also extremely simple.

I do not limit myself to the exact construction shown, since any number of pole divisions from two up may be used. The field may be a group of separate magnets combined or may be constructed and wound in any known way which will give resultant poles facing each other which may be divided. The pole divisions may have their ends not faced off square, but instead cut by a cone, like the ends of the teeth of bevel-gear, and the machine may run upon its side instead of upright.

Having described what I consider the best embodiment of my invention, what I claim, and desire to hold by Letters Patent, is—

1. A continuously-magnetized field-magnet, having its poles facing each other, each pole divided into two or more equal pole divisions, alternately right and left hand wound with generating-coils, separate inductor masses reaching nearly across between the poles, and each substantially of the size of the presenting end of one of the said pole divisions, and a non-magnetic carrier arranged in one position to present the said inductors fairly to all the right-hand-wound pole divisions, directing the magnetic flux through them, and in the next position to present these inductors to all the left-hand-wound divisions, directing this flux in the same way through them, whereby an alternating current is induced in the said generating-coils, as specified.

2. A field-magnet (or group of magnets) of which the resultant north pole is a cylindrical ring standing out toward and facing the similar resultant south pole, these poles divided at the presenting ends into pole divisions projecting like the teeth of crown-wheels, and wound alternately right and left with generating-coils, and between them a rotary, non-magnetic carrier, having separate inductor masses spaced in arc twice as far apart as adjacent pole divisions, and moving close to the ends of the divisions of both poles, whereby the magnetic circuit is completed across in one position between the right-hand-wound divisions, and in the next position between those left-hand wound, and an alternating electric current is generated, substantially as specified.

3. A field-magnet of which the resultant north pole is a cylindrical ring standing out toward and facing the similar resultant south pole, these poles divided at the presenting ends into pole divisions projecting like the teeth of crown-wheels, and wound alternately right and left with generating-coils, and between them a rotary, non-magnetic carrier, having separate inductor masses arranged to move close to the ends of the divisions of both poles, the said generating-coils being connected into two or more circuits, and the pole divisions of each circuit being so spaced and arranged that all the right-hand-wound divisions of that circuit shall be fairly presented to the inductors in one position, and when the inductors have moved part of the breadth of one pole division, the right-hand-wound divisions of another circuit shall in like manner be fairly presented, whereby the induced electrical impulse in this latter circuit is part of a wave-length behind that in the first circuit, and the two currents differ in phase, as herein set forth.

4. The continuously-magnetized field, consisting of the coils $m$, $m$, wound upon the cores $n$, $n$, connecting at the ends through the extensions $p$, $p$, to the ring-poles $o$, $o'$, which carry the resultant pole extensions, divided into the pole divisions $k$, $k$, $k'$, $k'$, facing each other and right and left hand wound with the generator-coils, in combination with the carrier $i$, and inductor masses $j$, $j$, bridging across between the north and south pole divisions $k$, $k'$, $k$, $k'$, as herein described.

In testimony whereof I have signed my name to this specification, in the presence of two subscribing witnesses, on this 4th day of March, A. D. 1897.

HENRY FAIRBANKS.

Witnesses:
C. H. HORTON,
E. A. SILSBY.